(12) United States Patent
Hashimoto et al.

(10) Patent No.: US 11,662,840 B2
(45) Date of Patent: May 30, 2023

(54) CAPACITANCE ELECTRONIC PEN

(71) Applicant: Wacom Co., Ltd., Saitama (JP)

(72) Inventors: Yoshiyuki Hashimoto, Saitama (JP); Shinya Aoki, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 17/945,946

(22) Filed: Sep. 15, 2022

(65) Prior Publication Data
US 2023/0018530 A1    Jan. 19, 2023

Related U.S. Application Data

(63) Continuation of application No. 17/243,435, which is a continuation of application No. (Continued)

(30) Foreign Application Priority Data

Nov. 9, 2018 (JP) .............................. JP2018-211369

(51) Int. Cl.
G06F 3/0354     (2013.01)
G06F 3/038      (2013.01)

(52) U.S. Cl.
CPC .......... G06F 3/03545 (2013.01); G06F 3/038 (2013.01)

(58) Field of Classification Search
None
See application file for complete search history.

(56) References Cited

U.S. PATENT DOCUMENTS

2012/0146958 A1   6/2012   Oda et al.
2016/0018912 A1*  1/2016   Kaneda .................. G06F 3/033
                                              345/179
(Continued)

FOREIGN PATENT DOCUMENTS

JP    2012128556 A    7/2012
JP    2013161307 A    8/2013
(Continued)

OTHER PUBLICATIONS

Extended European Search Report, dated Nov. 9, 2021, for European Application No. 19881593.8-1216 / 3869304, 9 pages.
(Continued)

*Primary Examiner* — Stephen T. Reed
(74) *Attorney, Agent, or Firm* — Seed IP Law Group LLP

(57) ABSTRACT

An electronic pen includes a housing, a core body having a front end that protrudes from an opening in a side of the housing, and a coupling member housing one or more components of the electronic pen. The housing includes a first housing portion and a second housing portion separated in an axial direction of the housing. The first housing portion includes an opening arranged such that the front end of the core body protrudes outside while the first housing portion is electrically separated from the core body. A protrusion portion formed on an outer peripheral surface of the coupling member electrically separates the first and second housing portions. One side of the cylindrical coupling member in the axial direction with respect to the protrusion portion is fitted to the first housing portion, and another side in the axial direction is fitted to the second housing portion.

17 Claims, 6 Drawing Sheets

Related U.S. Application Data

PCT/JP2019/041329, filed on Oct. 21, 2019, now Pat. No. 11,481,046.

(56) References Cited

U.S. PATENT DOCUMENTS

| | | | |
|---|---|---|---|
| 2016/0334894 A1* | 11/2016 | Fujitsuka | G06F 3/0442 |
| 2017/0262086 A1 | 9/2017 | Ogata et al. | |
| 2019/0050072 A1 | 2/2019 | Munakata et al. | |

FOREIGN PATENT DOCUMENTS

| | | | |
|---|---|---|---|
| JP | 2016053750 A | 4/2016 | |
| JP | 2016126503 A | 7/2016 | |
| JP | 2016134168 A | 7/2016 | |
| WO | WO 2016084424 A1 | 6/2016 | |

OTHER PUBLICATIONS

International Search Report, dated Jan. 14, 2020, for International Application No. PCT/JP2019/041329, 2 pages.

* cited by examiner

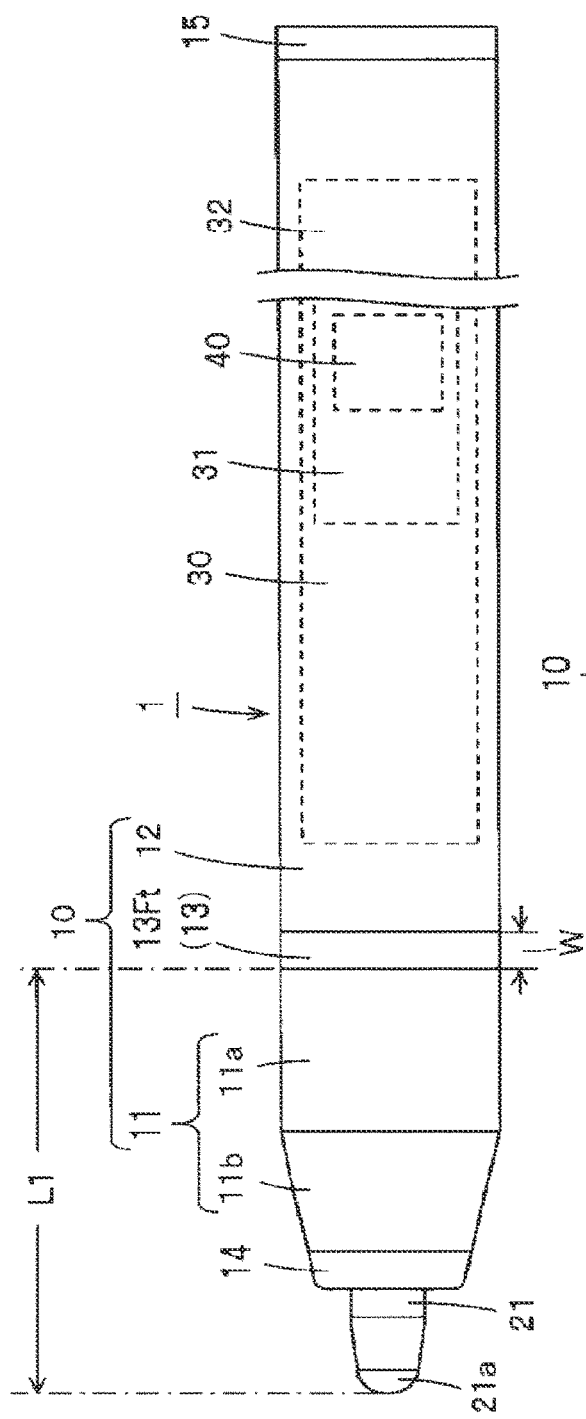
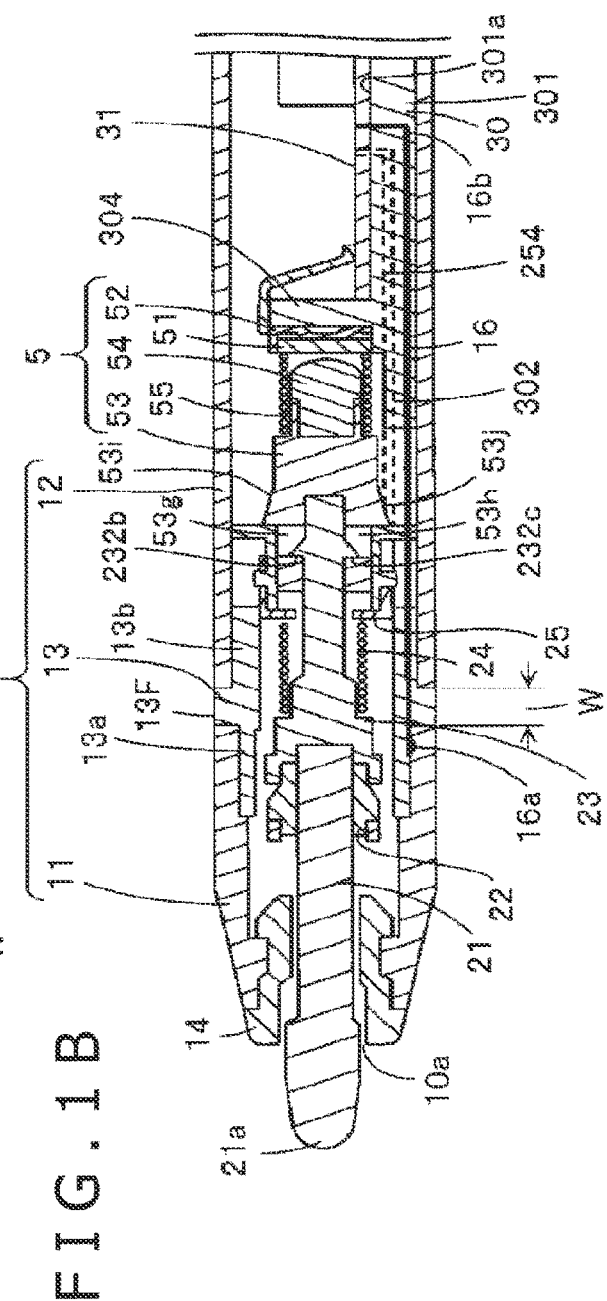
F I G. 1A
F I G. 1B

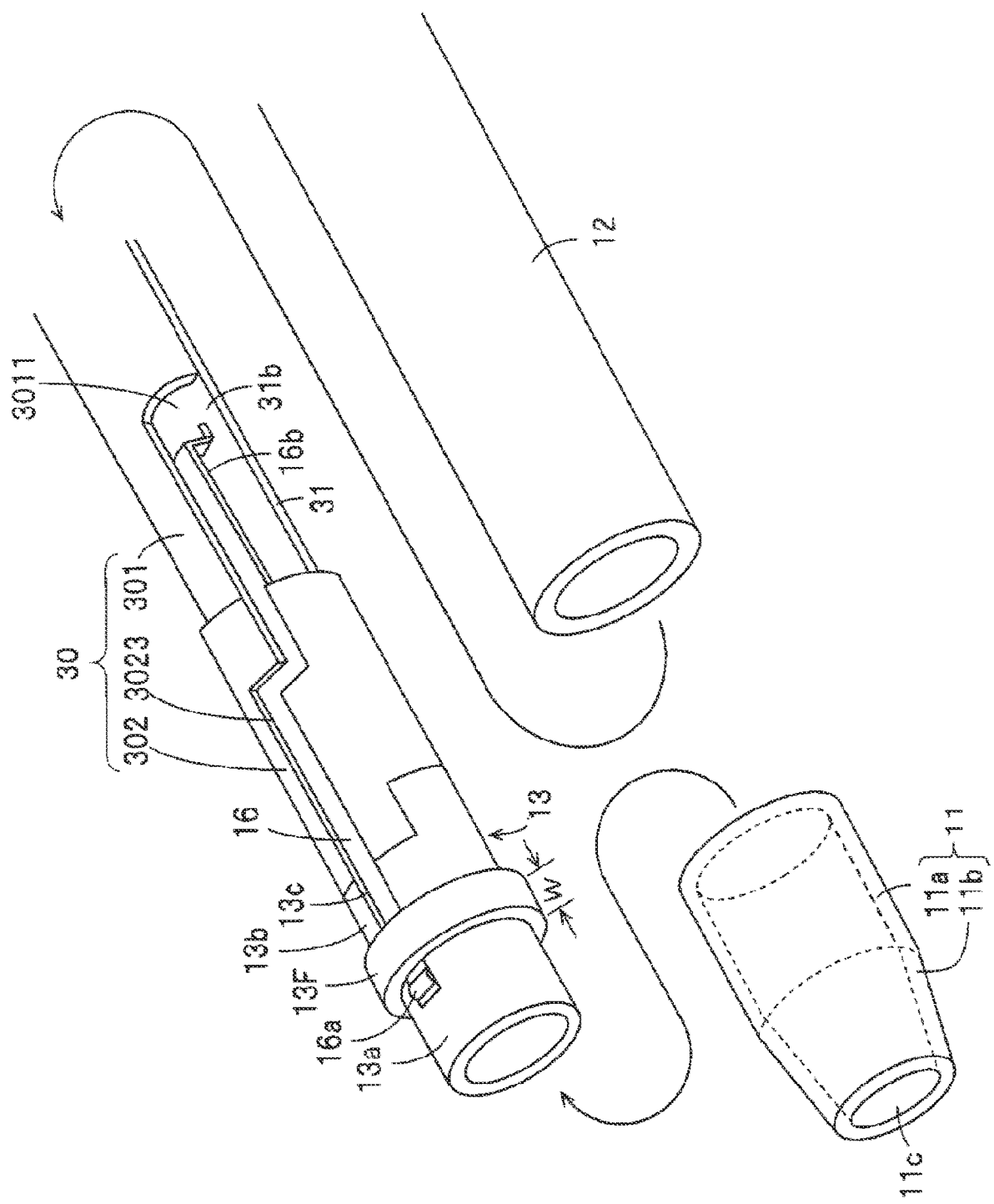
F I G. 2

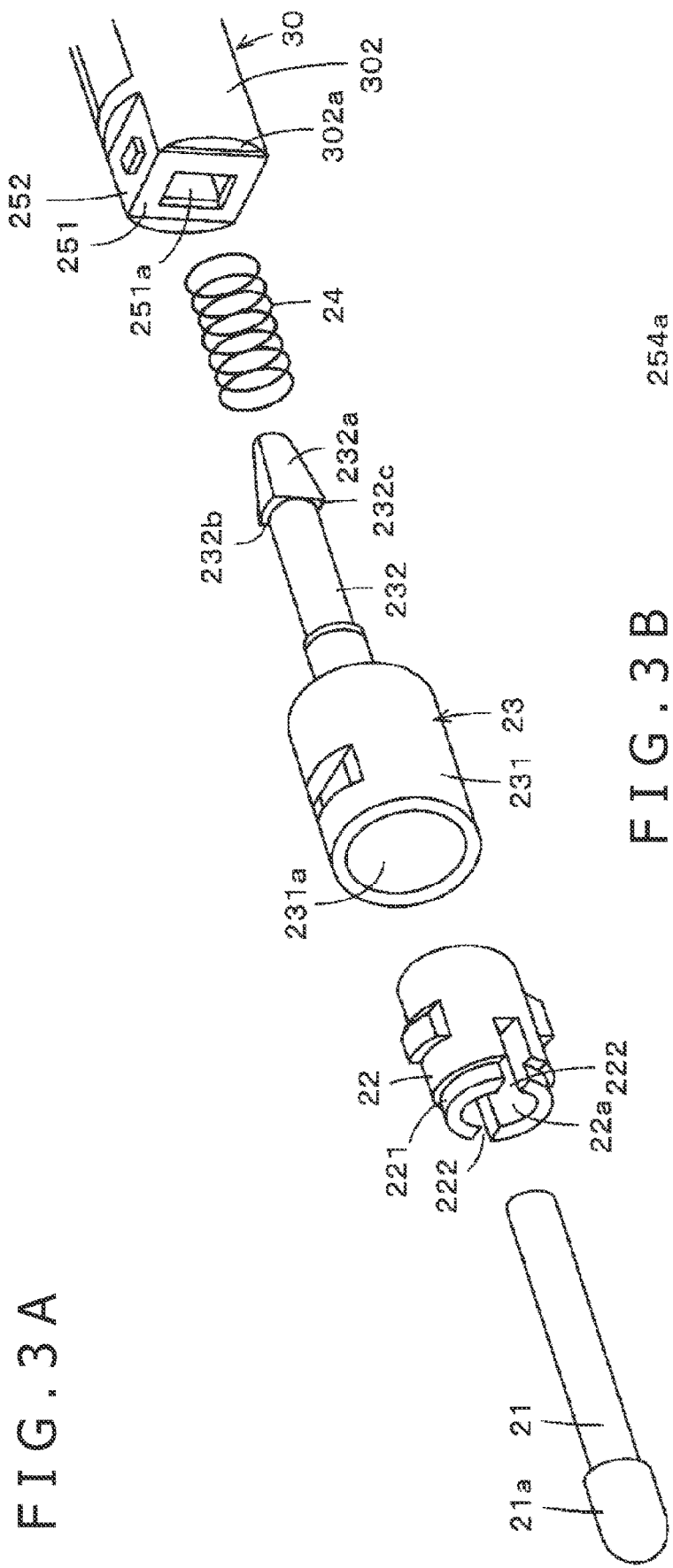
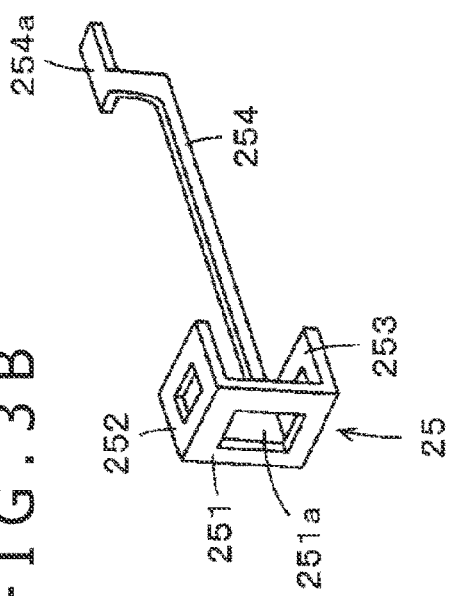
FIG. 3A
FIG. 3B

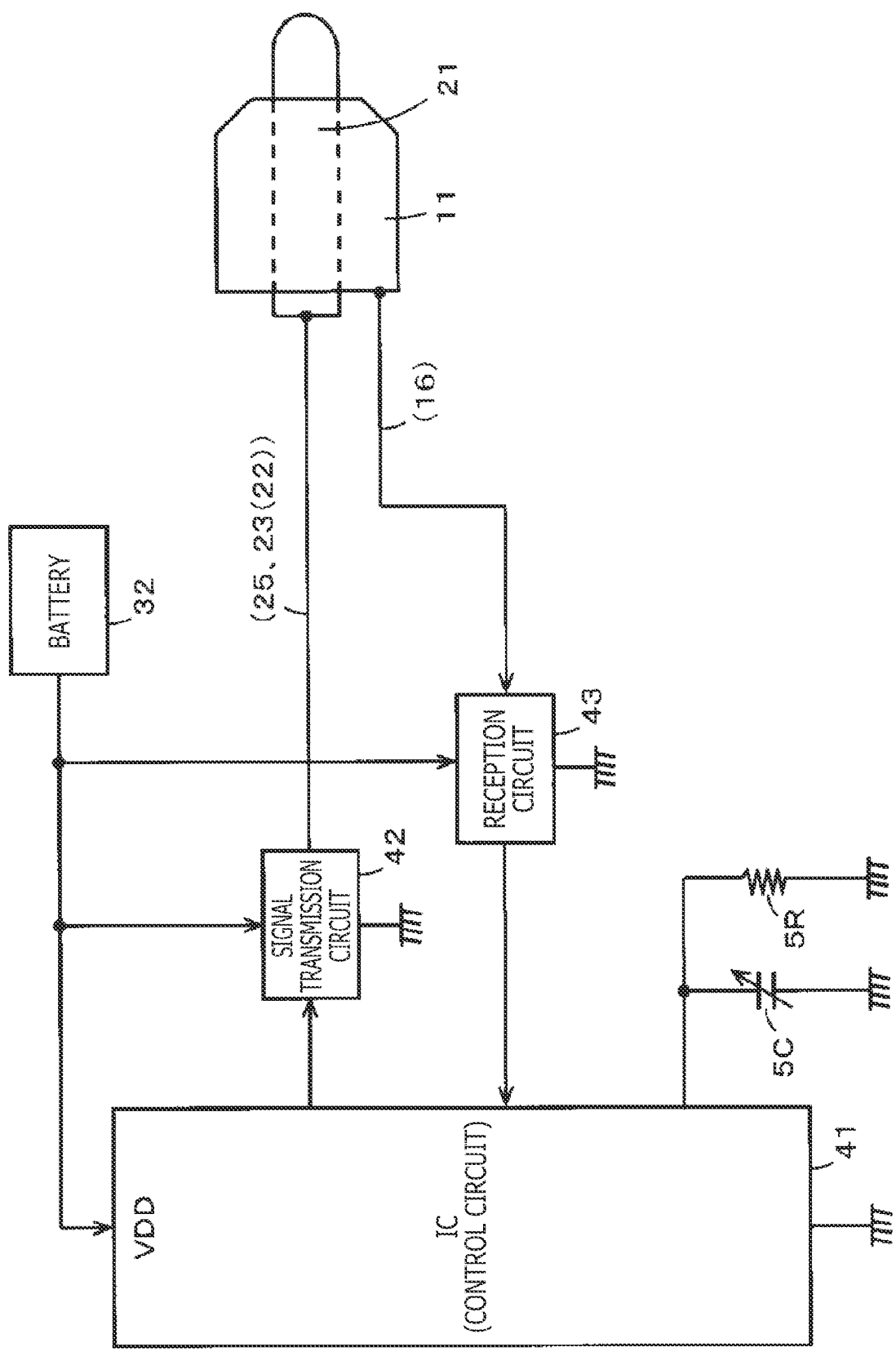
F I G . 5

CAPACITANCE ELECTRONIC PEN

BACKGROUND

Technical Field

The disclosure relates to a capacitance electronic pen used along with a position detection apparatus.

Background Art

An example of a prized capacitance electronic pen includes a generally-called active capacitance electronic pen that performs a transfer (interaction) of a signal to and from a position detection sensor of a position detection apparatus through electric field coupling, thereby allowing the position detection sensor to detect a position instructed by the electronic pen.

This type of electronic pen includes, in a hollow portion of a cylindrical housing, a battery (primary battery or secondary battery) as a power supply, a pen pressure detection unit, a circuit board provided with a signal transmission circuit, and the like, in which the components are lined up and housed in an axial direction of the housing of the electronic pen.

In this case, the circuit board is mounted on a board holder, and the pen pressure detection unit includes pressure sensing components and pressure transmission members housed in a housing for pen pressure detection unit. Furthermore, the pen pressure detection unit and the board holder are often coupled in the axial direction of the housing of the electronic pen to form a unit (form a module). The board holder includes a housing part of the pen pressure detection unit in some cases.

In the electronic pen, constituent components of the electronic pen and the battery are lined up in the axial direction and housed in the hollow portion of the cylindrical housing. In this way, a unit of the constituent components of the electronic pen is formed, and the electronic pen can prevent an impact on an internal circuit caused by a drop impact, can increase the strength, and can slightly adjust the internal circuit. In addition, there is an advantage that only the housing of the electronic pen is replaced to allow handling the electronic pen in various housing shapes.

Meanwhile, in active capacitance electronic pens of recent years, an electronic pen of two-way communication has emerged that receives a signal from a position detection sensor side, which detects an instruction position of the electronic pen, and that transmits a signal in a format based on a request of the received signal (for example, see Patent Document 1 (Japanese Patent Laid-Open No. 2016-134168)).

In this type of electronic pen of two-way communication, the position and the size of a reception unit (antenna) that receives the signal from the position detection sensor are important. In the case of the capacitance electronic pen, the signal transmitted from the position detection sensor is based on an electric field that can be received through capacitive coupling, and the travel distance is significantly short. Therefore, the reception unit (antenna) of the electronic pen of two-way communication is arranged at a position close to the pen tip to allow the signal from the position detection sensor to be received at high strength. Furthermore, the reception unit (antenna) of the electronic pen needs to have a size that provides a reception range as large as possible.

Therefore, in the electronic pen of Patent Document 1, the reception unit (antenna) includes a peripheral electrode including a cylindrical conductor provided to cover around a core body made of a conductive material, up to near a tip portion of the core body, while electrical insulation from the core body is taken into account.

Furthermore, it is proposed in recent years to use a position detection apparatus to detect a tilt angle of the electronic pen with respect to the position detection sensor surface (angle formed by the axial direction of the electronic pen and the position detection sensor surface) and to reflect the detected tilt angle on the thickness or the like of an instruction trajectory (writing trace) of the electronic pen. An example of this type of electronic pen corresponding to the detection of the tilt angle is disclosed in, for example, Patent Document 2 (Japanese Patent Laid-Open No. 2016-126503).

As disclosed in Patent Document 2, this type of electronic pen corresponding to the detection of the tilt angle or the like also includes a peripheral electrode including a cylindrical conductor provided to cover around the core body, up to near the tip portion of the core body, as in the electronic pen of two-way communication.

FIGS. 6A and 6B illustrate an example of a configuration on a pen tip side of this type of conventional capacitance electronic pen. FIG. 6A illustrates an appearance of the electronic pen, and FIG. 6B is a longitudinal cross-sectional view of the electronic pen. An electronic pen 100 of this example includes a front cap 102 including a tapered cylindrical body fitted and attached to an opening on the pen tip side of a cylindrical housing 101 as illustrated in FIGS. 6A and 6B. The housing 101 is made of a conductive material, such as metal, so that the housing 101 is earthed (grounded) through the human body when the user holds and operates the electronic pen 100. In addition, the front cap 102 is made of an insulating material, such as a resin.

As illustrated in FIG. 6B, an opening 102a is provided on the tapered pen tip side of the front cap 102 so that a core body 103 can be inserted and freely moved in the axial direction. The core body 103 is made of a conductive material. The core body 103 is inserted into the housing of the electronic pen 100 from the opening 102a of the front cap 102 and is held by a core body holder 113 described later, with a tip portion 103a of the core body 103 protruding outside. In this case, the core body 103 made of a conductive material and the housing 101 made of a conductive material are electrically separated (insulated) through the front cap 102.

As illustrated in FIG. 6B, a board holder 105 that places, on a mounting portion 105a, a printed board 104 provided with circuit components, such as a signal transmission circuit, is housed in a hollow portion of the housing 101. The board holder 105 is made of a resin that is an insulating material elongated in the axial direction, and in the example of FIG. 6B, the board holder 105 includes a cylindrical portion 105b on the pen tip side in the axial direction with respect to the mounting portion 105a. Pressure sensing components and pressure transmission members included in a pen pressure detection unit 106 are housed in the cylindrical portion 105b. The pen pressure detection unit 106 of the example includes a variable capacitor in which the capacitance changes according to the pen pressure applied to the core body 103.

The pressure sensing components of the example include a plurality of components including a dielectric 107, a terminal member 108, a holding member 109, a conductive member 110, and an elastic member 111 as illustrated in FIG. 6B. The terminal member 108 is made of a conductive material, such as SUS, and is included in a first electrode of a variable capacitor including pressure sensing components. In addition, the conductive member 110 is made of, for example, conductive rubber, and the elastic member 111 includes a coil spring made of a conductive material, such as SUS. The conductive member 110 and the elastic member 111 are electrically connected and provide a second electrode of the variable capacitor. The conductive member 110 is held by the holding member 109. Furthermore, the elastic member 111 is arranged between the dielectric 107 and the holding member 109, and the elastic member 111 is provided so that the conductive member 110 is biased all the time in a direction away from the dielectric 107.

The side of the core body 103 opposite the tip portion is fitted to the core body holder 113 made of a conductive material through a conductive elastic member 112, and the core body 103 is coupled to and held by the core body holder 113. Furthermore, the core body holder 113 is fitted to the holding member 109 of the pressure sensing components in the cylindrical portion 105b of the board holder 105, and the pressure (pen pressure) applied to the core body 103 is transmitted to the pressure sensing components.

In this case, the core body holder 113 including the conductive elastic member 112 functions as a pressure transmission member that transmits, to the pressure sensing components, the pressure (pen pressure) applied to the core body 103. In this case, the core body holder 113 is housed in a housing 114 for holding the core body holder 113 as illustrated in FIGS. 6A and 6B.

Furthermore, a coil spring 115 that always biases the core body holder 113 toward the core body 103 is provided in the housing 114. The coil spring 115 is made of a conductive material, such as conductive metal, and one end of the coil spring 115 is electrically connected to the signal transmission circuit arranged on the printed board 104, although not illustrated.

The core body holder 113 is made of a conductive material, and the core body 103 made of a conductive material and installed on the core body holder 113 through the conductive elastic member 112 is electrically connected to the signal transmission circuit arranged on the printed board 104 through the coil spring 115.

In the electronic pen 100 of the example, the core body 103 is displaced inside of the housing 101 of the electronic pen 100 in the axial direction when the pressure (pen pressure) is applied to the front end side of the core body 103. Consequently, the core body holder 113 provided with the core body 103 is displaced in the axial direction together with the core body 103, and the conductive member 110 is displaced toward the dielectric 107 against the elastic force of the elastic member 111 of the pressure sensing components. Consequently, the contact area of the conductive member 110 and the dielectric 107 is changed according to the applied pressure, and the capacitance of the variable capacitor including the pen pressure detection unit 106 is changed according to the applied pressure. Therefore, the pen pressure can be detected based on the capacitance of the variable capacitor including the pen pressure detection unit 106.

Furthermore, in the electronic pen 100 of the example, a peripheral electrode 116 made of a conductor material surrounding the core body 103 is fitted to a peripheral portion of the cylindrical portion 105b of the board holder 105 on the pen tip side as illustrated in FIG. 6B. The peripheral electrode 116 is electrically connected to the circuit components of the printed board 104 although not illustrated in FIG. 6B.

In this case, the peripheral electrode 116 is electrically separated (insulated) from the core body 103 due to the existence of a section near the opening portion 102a of the front cap 102. In addition, the front cap 102 also plays a role of electrically separating (insulating) the peripheral electrode 116 and the housing 101 of the electronic pen 100 as illustrated in FIG. 6B.

PRIOR ART DOCUMENT

Patent Documents

Patent Document 1: Japanese Patent Laid-Open No. 2016-134168
Patent Document 2: Japanese Patent Laid-Open No. 2016-126503

BRIEF SUMMARY

Technical Problems

Meanwhile, a portable terminal, such as a notebook computer and a tablet, of recent years is provided with a capacitance position detection sensor on which a display screen is placed, and the terminal can receive an instruction input of a capacitance electronic pen. Furthermore, the size and the thickness of this type of portable device are reduced to further improve the portability. Therefore, the size and the thickness of the capacitance electronic pen associated with the position detection sensor of this type of portable terminal also need to be reduced.

However, in the conventional electronic pen, the pressure sensing components and the core body holder 113 as a pressure transmission member housed in the housing 114 are housed in the cylindrical portion 105b of the board holder 105 in the pen pressure detection unit 106 as illustrated in FIG. 6B. Therefore, the cylindrical portion 105b of the board holder 105 providing the housing of the pen pressure detection unit 106 needs to have a thickness that allows to house the core body holder 113 as a pressure transmission member housed in the housing 114, and it is difficult to reduce the thickness due to the existence of the housing 114.

Furthermore, in the electronic pen of two-way communication or the electronic pen compatible with the detection of the tilt angle, the cylindrical peripheral electrode 116 needs to be electrically separated (insulated) from the housing 101 and the core body 103 and provided on the pen tip side of the electronic pen 100 as illustrated in FIG. 6B.

To realize the electrical separation (insulation) between the housing 101 and the peripheral electrode 116 in the conventional electronic pen 100, the front cap 102 made of an insulating material is provided on the pen tip side of the electronic pen 100, and the front cap 102 realizes the electrical separation (insulation) of the peripheral electrode 116 from the housing 101 and the core body 103. Therefore, the front cap 102 is placed between the housing 101 and the peripheral electrode 116 and between the peripheral electrode 116 and the core body 103 in the direction orthogonal to the axial direction of the electronic pen 100, and it is difficult to reduce the thickness of the electronic pen. In addition, the front cap 102 needs to have a complicated shape to provide the insulation.

In view of the problems, an object of the disclosure is to provide a capacitance electronic pen in which the thickness can be reduced.

Technical Solution

To solve the problems, provided is an electronic pen that includes: a cylindrical housing having a hollow portion, a core body made of a conductive material, the core body having a front end that protrudes from an opening in a side of the cylindrical housing, a plurality of components arranged in an axial direction of the housing in the hollow portion, a cylindrical coupling member made of an insulating material, the cylindrical coupling member housing at least some of the plurality of components. The cylindrical housing includes a first housing portion and a second housing portion separated in the axial direction of the housing. The first housing portion is made of a conductive material and includes an opening arranged such that the front end of the core body protrudes outside of the first housing portion through the opening in a state in which the first housing portion is electrically separated from the core body. A protrusion portion is formed on an outer peripheral surface of the cylindrical coupling member and the protrusion portion extends in a direction orthogonal to the axial direction of the housing from the peripheral side surface. An end surface of the protrusion portion is part of the cylindrical housing. A first side of the cylindrical coupling member in the axial direction of the housing with respect to the protrusion portion is fitted to the first housing portion, and a second side of the cylindrical coupling member in the axial direction of the housing with respect to the protrusion portion is fitted to the second housing portion. The first housing portion and the second housing portion are separated by the protrusion portion.

In the electronic pen with the configuration, some of the plurality of components included in the electronic pen, such as part of pen pressure detection components, can be housed in the hollow portion of the cylindrical coupling member. That is, a housing of a pen pressure detector can also be used as the cylindrical coupling member. In the cylindrical coupling member, the protrusion portion is part of the housing, and the thickness of the electronic pen can be reduced.

Furthermore, in the electronic pen with the configuration, the housing is divided into two portions, the first housing portion and the second housing portion. The first housing portion on the pen tip side is made of a conductive material. The first housing portion and the second housing portion are fitted to the first side and the second side of the cylindrical coupling member in the axial direction with respect to the protrusion portion to provide the housing of the electronic pen. In this case, the first housing portion and the second housing portion are not in contact with each other and are separated without coming into contact with each other due to the existence of the protrusion portion.

Therefore, in the electronic pen with the configuration, the first housing made of a conductive material can be provided as a peripheral electrode of an electronic pen of two-way communication or as a peripheral electrode of an electronic pen compatible with detection of a tilt angle. That is, the peripheral electrode can be provided as part of the housing. Therefore, the configuration is simplified, and the thickness of the electronic pen can be reduced.

BRIEF DESCRIPTION OF THE DRAWINGS

FIGS. 1A and 1B depict diagrams for describing a configuration example of an electronic pen according to an embodiment of the present disclosure.

FIG. 2 is a diagram for describing a configuration example of parts of an electronic pen according to an embodiment of the present disclosure.

FIGS. 3A and 3B depict diagrams for describing constituent components of an electronic pen according to an embodiment of the present disclosure.

FIG. 5 is a diagram for describing a circuit example of an electrical configuration of an electronic pen according to an embodiment of the present disclosure.

DETAILED DESCRIPTION

Figure 4:
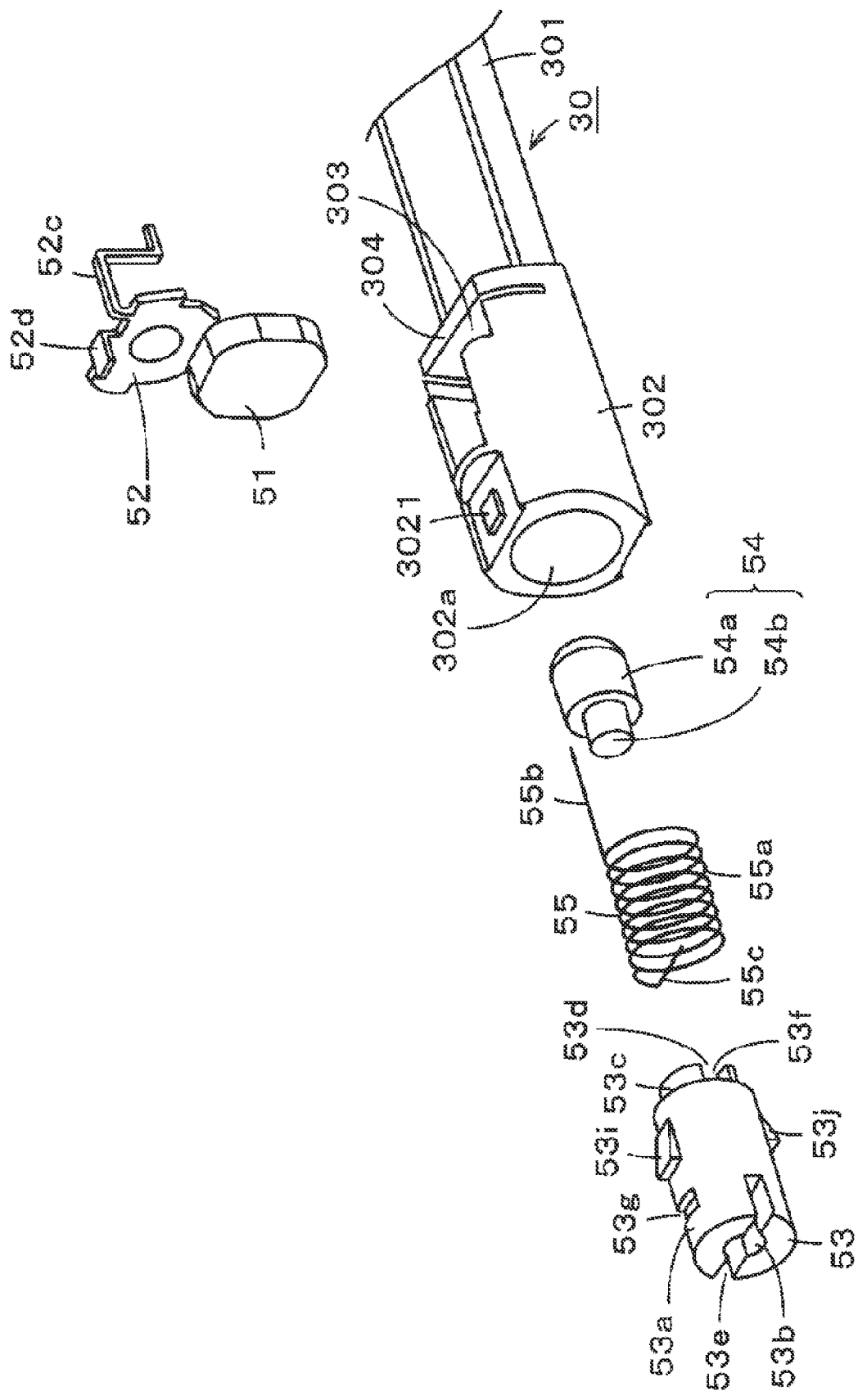
FIG. 4 is a diagram for describing constituent components of an electronic pen according to an embodiment of the present the present disclosure.

FIGS. 1A and 1B depicts diagrams for describing a configuration example of a capacitance electronic pen 1 according to an embodiment of the present disclosure. FIG. 1A is a diagram illustrating an appearance of the electronic pen 1, and FIG. 1B is a longitudinal cross-sectional view on a pen tip side of the electronic pen 1. In addition, FIG. 2 is an exploded perspective view for describing a configuration of a housing 10 of the capacitance electronic pen 1.

The housing 10 of the capacitance electronic pen 1 of the embodiment includes a first housing portion 11 on the pen tip side and a second housing portion 12 on a back end side that are coupled through a cylindrical coupling member 13. Furthermore, a core body 21 is held such that a tip portion 21a of the core body 21 protrudes outside from an opening 10a (see FIG. 1B) on the first housing portion 11 side of the housing 10. The core body 21 is made of a conductive material, such as conductive metal, and the core body 21 includes a rod-like body as illustrated in FIG. 1B.

Each of the first housing portion 11 on the pen tip side and the second housing portion 12 on the back end side is made of a conductive material, such as conductive metal, and the first housing portion 11 and the second housing portion 12 include cylindrical bodies as illustrated in FIGS. 1A, 1B, and 2.

The first housing portion 11 is shaped to include a cylindrical shape portion 11a with a constant outer diameter and a tapered portion 11b formed in a tapered shape gradually becoming narrower toward the pen tip side as illustrated in FIGS. 1 and 2. The second housing portion 12 has a cylindrical shape with an outer diameter equal to the outer diameter of the cylindrical shape portion 11a of the first housing portion 11.

The cylindrical coupling member 13 is made of an insulating material, a resin in the example, and is a cylindrical body as illustrated in FIGS. 1B and 2. At a position close to the center of a peripheral surface in the axial direction, a ring-shaped flange portion 13F (protruding portion) protruding in the direction orthogonal to the axial direction from the peripheral side surface is formed. The ring-shaped flange portion 13F has a predetermined width W (see FIGS. 1B, and 2) in the axial direction. An end surface of the ring-shaped flange portion 13F is flush with the first housing portion 11 and the second housing portion 12 without a difference in level and is part of the housing 10 as illustrated in FIGS. 1A and 1B. That is, the diameter of the peripheral portion of the ring-shaped flange portion 13F is selected to be equal to the outer diameter of the first housing portion 11 and the second housing portion 12.

Furthermore, the pen tip side that is one side of the cylindrical coupling member 13 in the axial direction with respect to the ring-shaped flange portion 13F is a first fitting cylindrical portion 13a fitted to the cylindrical shape portion 11a of the first housing portion 11. The outer diameter of the first fitting cylindrical portion 13a of the cylindrical coupling member 13 is equal to or slightly smaller than the inner diameter of the cylindrical shape portion 11a of the first housing portion 11. The cylindrical shape portion 11a of the first housing portion 11 is pressed, fitted, and coupled to the first fitting cylindrical portion 13a of the cylindrical coupling member 13, up to the location of the ring-shaped flange portion 13F.

In addition, the back end side of the cylindrical coupling member 13 in the axial direction with respect to the ring-shaped flange portion 13F is a second fitting cylindrical portion 13b fitted to the second housing portion 12. The outer diameter of the second fitting cylindrical portion 13b of the cylindrical coupling member 13 is equal to or slightly smaller than the inner diameter of the second housing portion 12. The second housing portion 12 is pressed, fitted, and coupled to the second fitting cylindrical portion 13b of the cylindrical coupling member 13, up to the location of the ring-shaped flange portion 13F.

The first housing portion 11 and the second housing portion 12 are inserted, fitted, and coupled to the cylindrical coupling member 13 as indicated by arrows in FIG. 2, and in this state, the housing 10 as one cylindrical body is formed as illustrated in FIGS. 1A and 1B. In this case, as described above, the peripheral surface of the cylindrical shape portion 11a of the first housing portion 11, the peripheral surface of the second housing portion 12, and the end surface of the ring-shaped flange portion 13F are flush with each other. Furthermore, the first housing portion 11 and the second housing portion 12 made of a conductive material are not in contact with each other and are electrically separated (insulated) from each other due to the existence of the ring-shaped flange portion 13F of the cylindrical coupling member 13.

A front cap 14 made of an insulating material, such as a resin, is provided at an opening 11c (see FIG. 2) on the pen tip side of the first housing portion 11 as illustrated in FIGS. 1A and 1B. The opening 10a with a diameter slightly larger than the diameter of the core body 21 is formed on the front cap 14. The core body 21 is inserted into the housing 10 of the electronic pen 1 through the opening 10a of the front cap 14. The core body 21 and the first housing portion 11 made of a conductive material are electrically separated (insulated) by the front cap 14 as an insulating material as illustrated in FIG. 1B. In the electronic pen 1 of the embodiment, the first housing portion 11 is provided to cover the back end side of the core body 21 with respect to the tip portion 21a as illustrated in FIG. 1B, and the first housing portion 11 provides a peripheral electrode.

A board holder 30 provided with a printed circuit board 31 mounted on a board mounting table portion 301 and a battery 32 as a power supply are housed in a hollow portion of the second housing portion 12 as illustrated in FIGS. 1A and 1B. The battery 32 may be a primary battery or may be a secondary battery (rechargeable battery). The back end side of the second housing portion 12 is blocked by a back cap 15 as illustrated in FIG. 1A.

The board holder 30 is made of an insulating resin, and the board holder 30 includes a pressure sensing component holding portion 302 on the opposite side of the board mounting table portion 301 side in the longitudinal direction that is the axial direction of the electronic pen 1. When the board holder 30 is housed in the hollow portion of the housing 10, the pressure sensing component holding portion 302 and the board mounting table portion 301 are continuous in the longitudinal direction that is the axial direction of the electronic pen 1 as illustrated in FIG. 1B. The pressure sensing component holding portion 302 has a cylindrical shape including a hollow portion that houses pressure sensing components 5 (a plurality of components for pen pressure detection) in a hollow portion inside. The board mounting table portion 301 has a boat-like shape that mounts and holds the printed circuit board 31 and has a shape as if a cylindrical body is cut in substantially half in the axial direction.

The board holder 30 is housed in the housing 10 such that the pressure sensing component holding portion 302 is on the core body 21 side. Furthermore, a core body holder 23 that holds the core body 21 is coupled to the pressure sensing component holding portion 302, and the pressure (pen pressure) applied to the core body 21 is transmitted to the pressure sensing components 5 of the pressure sensing component holding portion 302.

The outer diameter of the pressure sensing component holding portion 302 of the board holder 30 is selected to be equal to or a little smaller than the outer diameter of the second fitting cylindrical portion 13b of the cylindrical coupling member 13 in the embodiment. Furthermore, as illustrated in FIG. 2, part of the pressure sensing component holding portion 302 of the board holder 30 is fitted to part of the second fitting cylindrical portion 13b of the cylindrical coupling member 13 to thereby couple the pressure sensing component holding portion 302 of the board holder 30 and the second fitting cylindrical portion 13b of the cylindrical coupling member 13.

As illustrated in FIGS. 1B and 2, the pressure sensing component holding portion 302 is fitted and coupled to the second fitting cylindrical portion 13b of the cylindrical coupling member 13 in the axial direction to regulate the position of the board holder 30 to prevent the board holder 30 from moving in the axial direction in the housing 10.

Furthermore, although not illustrated, both ends of the battery 32 arranged on the opposite side of the pressure sensing component holding portion 302 on the board mounting table portion 301 of the board holder 30 are electrically connected to a power line and a copper foil pattern of an earth line of the printed circuit board 31. In this way, the voltage of the battery 32 is supplied as a power supply voltage to the circuit formed on the printed circuit board 31.

In the present embodiment, the second housing portion 12 made of a conductive material is electrically connected to the copper foil pattern of the earth line of the printed circuit board 31.

In the present embodiment, a peripheral circuit unit is provided on the printed circuit board 31, the peripheral circuit unit including an IC (Integrated Circuit) 41 (see FIGS. 1A and 5) including a signal generation circuit that generates a signal to be transmitted from the core body 21 and a control circuit that controls the transmission of the signal from the signal generation circuit to the core body 21, and peripheral circuit components of the IC 41. Although not illustrated, the peripheral circuit unit includes a push switch (side switch) and a charging circuit of the battery 32.

In the present embodiment, the core body 21 is fitted to the core body holder 23 made of a conductive material through a conductive elastic member 22 as illustrated in FIG. 1B, and the core body 21 is coupled to and held by the core body holder 23. Furthermore, the core body holder 23 is fitted to a holding member 53 described later of the pressure sensing components 5 in the pressure sensing component holding portion 302 of the board holder 30, and the pressure (pen pressure) applied to the core body 21 is transmitted to the pressure sensing components 5. In this case, a coil spring 34 as an example of an elastic member made of a conductive material, such as conductive metal, provided between the core body holder 23 and the board holder 30 always biases the core body holder 23 toward the core body 21 with respect to the board holder 30. Note that the coil spring 24 provides, along with a conductor terminal member 25 described later, an electrical connection member for transmitting the signal from the IC 41 arranged on the printed circuit board 31 to the core body 21.

FIG. 3A is an exploded perspective view of the part of the core body 21, the conductive elastic member 22, the core body holder 23, the coil spring 24, and the pressure sensing component holding portion 302 of the board holder 30.

The conductive elastic member 22 is made of, for example, conductive rubber and is formed in a cylindrical shape including a through hole 22a to which an end portion of the core body 21 on the opposite side of the tip portion 21a is fitted. The core body 21 side of the conductive elastic member 22 includes a thin portion with the outer diameter smaller than the outer diameter of the other parts, and slits 222 are formed to provide a grip portion 221 that facilitates gripping the core body 21.

According to the configuration, an arc-shaped part of the grip portion 221 including two thin portions provided with the slit portions 222 is used to grip the core body 21. Therefore, the core body 21 can be easily inserted and fitted to the grip portion 221 of the conductive elastic member 22 and can be pulled by predetermined force to easily pull out the core body 21 from the conductive elastic member 22.

The core body holder 23 is made of, for example, a conductive material, such as SUS (Steel Special Use Stainless), and a house fitting portion 231 including a recess hole 231a for housing and fitting the conductive elastic member 22 and a rod-like portion 232 fitted to the holding member 53 described later of the pressure sensing components 5 are integrated to form the core body holder 23.

After the conductive coil spring 24 is installed on the rod-like portion 232 of the core body holder 23 housing the conductive elastic member 22 as described above, the rod-like portion 232 of the core body holder 23 is fitted to the holding member 53 of the pressure sensing components 5 in the pressure sensing component holding portion 302 of the board holder 30.

In this case, the transmission signal generated by the circuit provided on the printed circuit board 31 needs to be supplied to the core body 21, and this needs to be taken into account in the electronic pen 1 of the present embodiment. However, the board holder 30 and the holding member 53 of the pressure sensing components 5 housed in the pressure sensing component holding portion 302 are made of a resin that is an insulating material, and the core body holder 23 and the holding member 53 cannot be electrically connected.

Therefore, in the present embodiment, the coil spring 24 made of a conductive material provided between the core body holder 23 and the pressure sensing component holding portion 302 of the board holder 30 and the conductor terminal member 25 provided in the pressure sensing component holding portion 302 of the board holder 30 provide electrical connection members, and the electrical connection members realize the electrical connection for supplying the signal from the signal transmission circuit of the printed circuit board 31.

That is, in the embodiment, the conductor terminal member 25 made of a conductive material, such as SUS, is installed on the pressure sensing component holding portion 302 of the board holder 30 so as to cover an opening portion 302a side, into which the rod-like portion 232 of the core body holder 23 is inserted, as illustrated in FIG. 3A.

The conductor terminal member 25 includes, as illustrated in FIGS. 3A and 3B, an abutment plate portion 251 that covers the opening portion 302a side of the pressure sensing component holding portion 302 of the board holder 30 and that includes a through hole 251a into which the rod-like portion 232 of the core body holder 23 is inserted, and attachment plate portions 252 and 253 orthogonal to the abutment plate portion 251 and facing each other.

In addition, an extension portion 254 extending to the part of the board mounting table portion 301 across the part of the pressure sensing component holding portion 302 of the board holder 30 is provided. A terminal portion 254a that is, for example, soldered to the back side of the printed circuit board 31 is formed on a tip portion of the extension portion 254 in the example.

Furthermore, in the state in which the conductor terminal member 25 is installed on the pressure sensing component holding portion 302 of the board holder 30, the terminal portion 254a at the front end of the extension portion 254 extending from the conductor terminal member 25 is abutted to a conductor on the back surface side of the printed circuit board 31 mounted on the board mounting table portion 301 of the board holder 30 and is, for example, soldered as illustrated in FIG. 1B. In this way, the conductor terminal member 25 and the signal generation circuit formed on the front surface of the printed circuit board 31 are electrically connected.

Furthermore, as described above, in the state in which the rod-like portion 232 of the core body holder 23 provided with the conductive elastic member 22 is put through the coil spring 24, the rod-like portion 232 is inserted into the hollow portion of the pressure sensing component holding portion 302 of the board holder 30 through the through hole 251a of the abutment plate portion 251 of the conductor terminal member 25 and fitted to the pressure sensing component holding portion 302. The inner diameter of the coil spring 24 is larger than the external shape of the rod-like portion 232 of the core body holder 23.

Therefore, the coil spring 24 elastically comes into contact with the core body holder 23 and abuts and elastically comes into contact with the abutment plate portion 251 of the conductor terminal member 25. The coil spring 24 is made of a conductive material, and the conductive elastic member 22 and the core body holder 23 are conductive. Therefore, the conductive elastic member 22 fitted to the core body holder 23 through the coil spring 24 and the conductor terminal member 25 is electrically connected to the circuit unit of the printed circuit board 31.

Furthermore, as described above, the core body 21 is inserted and fitted to the through hole 22a of the conductive elastic member 22 fitted to the core body holder 23 housed in the housing 10 as described above, and the core body 21 is held with respect to the core body holder 23 through the conductive elastic member 22. In this state, the core body 21 is electrically connected to the signal transmission circuit of the printed circuit board 31, and the signal from the signal transmission circuit is supplied to the core body 21.

Next, the configuration of the pressure sensing component holding portion 302 of the board holder 30 and the pressure sensing components 5 as well as the fitting of the holding member 53 of the pressure sensing components 5 and the core body holder 23 will be described.

FIG. 4 is an exploded perspective view of the pressure sensing components 5 housed in the pressure sensing component holding portion 302 of the board holder 30. The pressure sensing components 5 are housed in the pressure sensing component holding portion 302 as illustrated in FIG. 4 and are provided as illustrated in FIG. 1B to provide a pen pressure detection module. Furthermore, the core body 21 is coupled to the pen pressure detection module through the core body holder 23, and the pen pressure applied to the tip portion 21a of the core body 21 is detected by the pressure sensing components 5 of the pen pressure detection module. In this case, part of the pressure sensing components 5 included in the pen pressure detection module moves in the axial direction along with the core body 21 and the core body holder 23 according to the pen pressure applied to the tip portion 21a of the core body 21, and the pen pressure detection module detects the pen pressure.

A variable capacitor is used in the case of the pen pressure detector of the example, in which the capacitance changes according to the pen pressure applied to the core body 21.

The pressure sensing components 5 of the example include a plurality of components including a dielectric 51, a terminal member 52, the holding member 53, a conductive member 54, and an elastic member 55 as illustrated in FIG. 4. The terminal member 52 is made of a conductive material, such as SUS, and provides the first electrode of the variable capacitor including the pressure sensing components 5. In addition, the conductive member 54 is made of, for example, conductive rubber, and the elastic member includes a coil spring made of a conductive material, such as SUS. The conductive member 54 and the elastic member 55 are electrically connected to provide the second electrode of the variable capacitor.

The pressure sensing component holding portion 302 of the board holder 30 includes a cylindrical body including a hollow portion as illustrated in FIG. 4, and the pressure sensing components 5 are lined up and housed in the axial direction in the hollow portion.

Among the pressure sensing components 5 including the plurality of components, the dielectric 51 and the terminal member 52 that are components not moved in the axial direction in the pressure sensing component holding portion 302 including the cylindrical body are inserted from a direction perpendicular to the board surface of the printed circuit board 31 orthogonal to the axial direction of the pressure sensing component holding portion 302 through an opening portion 303 including an opening in a direction orthogonal to the axial direction formed on part of the side peripheral surface of the cylindrical body of the pressure sensing component holding portion 302 as illustrated in FIG. 4, and the dielectric 51 and the terminal member 52 are housed as illustrated in FIG. 1B.

A wall portion 304 is provided at a boundary of the pressure sensing component holding portion 302 and the board mounting table portion 301 of the board holder 30, and the terminal member 52 is pressed against the wall portion 304.

The dielectric 51 includes a plate-like body with a predetermined thickness, and the dielectric 51 in contact with the terminal member 52 is housed in the pressure sensing component holding portion 302. Therefore, the dielectric 51 does not move toward the terminal member 52 in the axial direction in the pressure sensing component holding portion 302.

The terminal member 52 that plays a role of the first electrode of the variable capacitor includes a lead portion 52c. When the lead portion 52c is housed in the pressure sensing component holding portion 302, the lead portion 52c is soldered and connected to a land portion (not illustrated) on the board surface of the printed circuit board 31 mounted on the board mounting table portion 301 across the wall portion 304.

Note that the terminal member 52 includes an L-shaped projection 52d for holding a side surface portion on the opening portion 303 side of the dielectric 51 when the dielectric 51 and the terminal member 52 are housed in the pressure sensing component holding portion 302.

The holding member 53 is made of a non-conductive material, a resin as an insulating material in the example. As illustrated in FIG. 4, the holding member 53 includes a columnar shape portion 53a provided with a recess hole 53b in which the rod-like portion 232 of the core body holder 23 is pressed and fitted, on a side that is the core body 21 side in the axial direction of the holding member 53, and a ring-shaped projection portion 53c provided with a recess hole 53d for fitting the conductive member 54, on the opposite side of the recess hole 53b side in the axial direction.

The columnar shape portion 53a of the holding member 53 is provided with a slit 53e in the axial direction of the recess hole 53b with the intention to assist the ease of pressing and fitting the rod-like portion 232 of the core body holder 23 into the recess hole 53b. The columnar shape portion 53a of the holding member 53 includes the slit 53e, thereby providing a grip portion corresponding to the rod-like portion 232 of the core body holder 23, and the holding member 53 surely grips and holds the core body holder 23. That is, the columnar shape portion 53a of the holding member 53 provides a core body holder holding portion.

In addition, the ring-shaped projection portion 53c of the holding member 53 also includes a slit 53f communicating across the recess hole 53d. The conductive member 54 is surely gripped by the ring-shaped projection portion 53c and held by the holding member 53 due to the existence of the slit 53f.

In addition, opening portions 53g and 53h communicating with the recess hole 53b are formed on a side surface portion of the columnar shape portion 53a of the holding member 53, the opening portions 53g and 53h facing each other across a cylinder central axis position. In addition, engagement projection portions 53i and 53j are formed on a peripheral surface of the columnar shape portion 53a of the holding member 53.

On the other hand, stage portions 232b and 232c engaged with the opening portions 53g and 53h of the holding member 53 are formed near a tip portion 232a of the rod-like portion 232 of the core body holder 23 as illustrated in FIG. 3A. When the rod-like portion 232 of the core body holder 23 is pressed and fitted to the recess hole 53b of the holding member 53 as illustrated in FIG. 1B, the stage portions 232b and 232c are abutted against wall portions of the opening portions 53g and 53h and engaged to prevent the rod-like portion 232 from falling out to the core body 21 side.

The conductive member 54 includes a conductive elastic member that can be elastically deformed and is made of, for example, silicone conductive rubber or pressure conductive rubber. The conductive member 54 includes a projection portion 54a fitted to the recess hole 53d of the ring-shaped projection portion 53c of the holding member 53.

In addition, the elastic member 55 includes, for example, a conductive coil spring. The elastic member 55 includes an elastic winding portion 55a, a terminal piece 55b at one end portion of the winding portion 55a, and a connection portion 55c at another end portion of the winding portion 55a.

The ring-shaped projection portion 53c of the holding member 53 is housed in the winding portion 55a of the elastic member 55, and the elastic member 55 is assembled in the axial direction of the holding member 53. Furthermore, the projection portion 54a of the conductive member 54 is fitted to the recess hole 53d of the ring-shaped projection portion 53c of the holding member 53. In this case, the connection portion 55c of the elastic member 55 is inserted into a bottom portion of the recess hole 53d formed on the ring-shaped projection portion 53c from a slit portion of the ring-shaped projection portion 53c of the holding member 53. Therefore, when a small diameter portion 54b of the conductive member 54 is pressed and fitted to the ring-shaped projection portion 53c of the holding member 53, an end surface of the small diameter portion 54b of the conductive member 54 is brought into contact with and electrically connected to the connection portion 55c of the conductive elastic member 55.

Furthermore, when the terminal piece 55b of the elastic member 55 is inserted into the pressure sensing component holding portion 302, the terminal piece 55b is soldered and connected to the conductive pattern on the board surface of the printed circuit board 31 mounted on the board mounting table portion 301 across the dielectric 51, the terminal member 52, and the wall portion 304.

Furthermore, the combination of the conductive member 54 with the holding member 53 in the axial direction through the elastic member 55 is inserted into the pressure sensing component holding portion 302 from the opening portion 302a side. Furthermore, the engagement projection portions 53i and 53j formed on the side peripheral surface of the columnar shape portion 53a of the holding member 53 are engaged with an engagement stage portion (see FIG. 1B) formed on the side peripheral surface of the pressure sensing component holding portion 302 to prevent the holding member 53 from falling out to the core body 21 side from the pressure sensing component holding portion 302. However, when the pen pressure is applied from the core body 21 side, the holding member 53 can move in the hollow portion of the pressure sensing component holding portion 302, toward the opposite side of the core body 21 in the axial direction. Furthermore, when the pen pressure is not applied from the core body 21 side any more due to the elastic biasing force of the elastic member 55, the engagement projection portions 53i and 53j return to the state of being engaged with the engagement stage portion of the pressure sensing component holding portion 302.

After the pressure sensing components 5 are housed in the cylindrical body of the pressure sensing component holding portion 302 in this way, the conductor terminal member 25 illustrated in FIG. 3B is elastically installed on the end surface of the pressure sensing component holding portion 302 on the opening 302a side as described above. Subsequently, as described above, the rod-like portion 232 of the core body holder 23 provided with the conductive elastic member 22 is inserted into the pressure sensing component holding portion 302 through the through hole 251a of the abutment plate portion 251 of the conductor terminal member 25 and is fitted to the holding member 53. In this way, the core body holder 23 is held with respect to the pressure sensing component holding portion 302 of the board holder 30.

Furthermore, while the core body holder 23 is fitted to the pressure sensing component holding portion 302 of the board holder 30 in this way, the core body 21 is pressed into the through hole 22a of the conductive elastic member 22 fitted to the core body holder 23. As a result, the core body 21 is firmly held by the conductive elastic member 22 with respect to the core body holder 23 as described above.

In this case, all of the core body 21, the conductive elastic member 22, and the core body holder 23 are conductive, and therefore, the core body 21 and the signal transmission circuit of the printed circuit board 31 are electrically connected through the conductive coil spring 24 and conductor terminal member 25 (see dotted line in FIG. 1B). Therefore, the signal from the signal transmission circuit of the printed circuit board 31 is transmitted from the core body 21.

Note that the core body 21 fitted and held by the core body holder 23 can be pulled out in the direction of the tip portion 21a. Therefore, the core body 21 can be replaced as described above.

When the pressure is applied to the tip portion 21a of the core body 21 in the electronic pen 1, the core body 21 is displaced toward the back end in the axial direction according to the pressure. Due to the displacement of the core body 21, the holding member 53 in the pressure sensing component holding portion 302 is displaced toward the dielectric 51 against the elastic biasing force of the elastic member 55. As a result, the conductive member 54 fitted to the holding member 53 is displaced toward the dielectric 51, and the distance between the conductive member 54 and the dielectric 51 and the contact area of the conductive member 54 and the dielectric 51 change according to the pressure applied to the core body 21.

In this way, the capacitance of the variable capacitor formed between the terminal member 52 included in the first electrode and the conductive member 54 included in the second electrode changes according to the pressure applied to the core body 21. The change in the capacitance of the variable capacitor is detected by the IC 41 provided on the printed circuit board 31, and the pen pressure is detected.

Next, the electrical connection of the first housing portion 11 included in the peripheral electrode and the circuit unit of the printed circuit board 31 will be described.

Here, FIG. 2 illustrates the first housing portion 11 and the second housing portion 12 when the board holder 30 is viewed from the opposite side of the board mounting table portion 301 and further illustrates the cylindrical coupling member 13. As illustrated in FIG. 2, a recess groove 13c is formed on the peripheral surface of the cylindrical coupling member 13 in the direction along the axial direction of the cylindrical coupling member 13, from the first fitting cylindrical portion 13a, below the lower part of the ring-shaped flange portion 13F, and across a second fitting cylindrical portion 13b. In this case, the recess groove 13c is formed throughout the entire axial direction in the second fitting cylindrical portion 13b.

Furthermore, a recess groove 3023 continuous with the recess groove 13c of the second fitting cylindrical portion 13b when coupled is also formed on the peripheral surface of the pressure sensing component holding portion 302 of the board holder 30 coupled to the second fitting cylindrical portion 13b of the cylindrical coupling member 13. The recess groove 3023 is extended to the position of the board mounting table portion 301 and formed throughout the entire peripheral surface of the pressure sensing component holding portion 302 in the axial direction. Furthermore, a cut-out portion 3011 is formed on the board mounting table portion 301 of the board holder 30 as illustrated in FIG. 2, such that a back surface 31b side of the placed printed circuit board 31 is visible from the cut-out portion 3011 side.

Furthermore, as illustrated in FIG. 2, a connection terminal conductor 16 made of a conductor material, conductor metal in the example, is arranged in the recess groove 13c and the recess groove 3023. In this case, as also illustrated in FIG. 1B, at least part of an end portion 16a of the connection terminal conductor 16 arranged in the recess groove 13c on the first fitting cylindrical portion 13a side of the cylindrical coupling member 13 is arranged to protrude a little more than the peripheral surface of the first fitting cylindrical portion 13a. However, the depth of the recess groove 13c of the part of the end portion 16a is set to a depth that allows to elastically press the end portion 16a downward when the end portion 16a is pressed from above.

In this way, when the first housing portion 11 is fitted to the first fitting cylindrical portion 13a of the cylindrical coupling member 13, the end portion 16a of the connection terminal conductor 16 and the inner wall of the first housing portion 11 are surely brought into contact with each other, and the first housing portion 11 and the connection terminal conductor 16 are electrically connected.

On the other hand, the depth of the part of the recess groove 13c provided on the second fitting cylindrical portion 13b side of the cylindrical coupling member 13 is deep, and the upper surface of the connection terminal conductor 16 arranged in the recess groove 13c is at a position lower than the peripheral surface position of the second fitting cylindrical portion 13b.

The depth of the recess groove 3023 provided on the pressure sensing component holding portion 302 of the board holder 30 is also similarly deep, and the upper surface of the connection terminal conductor 16 arranged in the recess groove 3023 is at a position lower than the peripheral surface position of the pressure sensing component holding portion 302.

In this way, when the second housing portion 12 housing the board holder 30 inside is fitted to the second fitting cylindrical portion 13b of the cylindrical coupling member 13, there is an air layer or gap between the upper surface of the connection terminal conductor 16 in the recess groove 13c and the recess groove 3023 and the inner wall surface of the second housing portion 12, and electrical separation (insulation) of the upper surface and the inner wall surface is realized.

Furthermore, the end portion 16b extending toward the printed circuit board 31 of the connection terminal conductor 16 is bent at the location of the cut-out portion 3011 of the board holder 30 and electrically connected to the back surface 31b side of the printed circuit board 31. Although not illustrated, the end portion 16b of the connection terminal conductor 16 is electrically connected to the circuit unit on the front side of the printed circuit board 31 through a through hole.

Note that instead of adjusting the depth of the recess groove 13c and the recess groove 3023, the thickness of the connection terminal conductor 16 may be changed. In this way, the end portion 16a may protrude slightly more than the peripheral surface of the first fitting cylindrical portion 13a, and there may be a space between the connection terminal conductor 16 and the second housing portion 12 in the second fitting cylindrical portion 13b and the pressure sensing component holding portion 302 of the board holder 30 to realize the insulation of the connection terminal conductor 16 and the second housing portion 12. Note that the upper surface of the connection terminal conductor 16 of the recess groove 13c may be covered by an insulating layer in the second fitting cylindrical portion 13b and the pressure sensing component holding portion 302 of the board holder 30 to more surely realize the insulation of the connection terminal conductor 16 and the second housing portion 12.

The assembly of the electronic pen 1 of the embodiment configured in this way will be described. First, the printed circuit board 31 provided with the circuit components in advance is mounted and fitted on the board mounting table portion 301 of the board holder 30. Next, the pressure sensing components 5 included in the pen pressure detector are housed in the pressure sensing component holding portion 302 of the board holder 30.

Next, as described above, the conductor terminal member 25 is attached to the pressure sensing component holding portion 302 of the board holder 30 such that the abutment plate portion 251 blocks the opening portion 302a side of the pressure sensing component holding portion 302 of the board holder 30. Furthermore, the terminal portion 254a at the front end of the extension portion 254 of the conductor terminal member 25 is soldered to the back surface 31b of the printed circuit board 31 and electrically connected to the circuit unit on a front surface 31a side of the printed circuit board 31 through the through hole.

Next, the core body holder 23 provided with the coil spring 24 at the part of the rod-like portion 232 is inserted into the pressure sensing component holding portion 302 from the opening portion 302a, with the coil spring 24 held between the core body holder 23 and the abutment plate portion 251 of the conductor terminal member 25, so that the core body holder 23 is held by the holding member 53.

Next, the core body holder 23 is housed in the hollow portion of the cylindrical coupling member 13, and the second fitting cylindrical portion 13b of the cylindrical coupling member 13 and the pressure sensing component holding portion 302 of the board holder 30 are coupled. Furthermore, the connection terminal conductor 16 is arranged in the recess groove 13c of the cylindrical coupling member 13 and the recess groove 3023 of the pressure sensing component holding portion 302 in the state as described above, and the end portion 16b of the connection terminal conductor 16 closer to the board mounting table portion 301 of the board holder 30 is soldered to the back surface 31b of the printed circuit board 31 and electrically connected to the circuit unit on the front surface 31a side of the printed circuit board 31 through the through hole.

Next, the cylindrical shape portion 11a of the first housing portion 11 provided with the front cap 14 at the opening 11c is fitted to the first fitting cylindrical portion 13a side of the cylindrical coupling member 13. In this case, the cylindrical shape portion 11a of the first housing portion 11 is pushed up to the location of the ring-shaped flange portion 13F and fitted to the first fitting cylindrical portion 13a of the cylindrical coupling member 13. As a result, the first housing portion 11 is pressed against and electrically connected to the end portion 16a of the connection terminal conductor 16 as illustrated in FIG. 1B. That is, the first housing portion 11 is fitted to the first fitting cylindrical portion 13a of the cylindrical coupling member 13 so that the first housing portion 11 is electrically connected to the circuit unit of the printed circuit board 31 through the connection terminal conductor 16.

Next, the second housing portion 12 is fitted to the second fitting cylindrical portion 13b of the cylindrical coupling member 13, with the board holder 30 housed in the hollow portion of the second housing portion 12. In this case, the second housing portion 12 is also pushed up to the location of the ring-shaped flange portion 13F and fitted to the second fitting cylindrical portion 13b of the cylindrical coupling member 13. Note that although not illustrated here, the second housing portion 12 housing the board holder 30 and fitted to the second fitting cylindrical portion 13b of the cylindrical coupling member 13 is electrically connected to the earth conductor of the printed circuit board 31.

Subsequently, the battery 32 is inserted and fixed in the hollow portion of the second housing portion 12, on the back end side of the board mounting table portion 301 of the board holder 30 in the axial direction. Furthermore, the opening of the second housing portion 12 on the back end side is blocked by the back cap 15.

Lastly, the core body 21 is inserted through the opening 10a of the front cap 14 installed on the first housing portion 11 and is fitted to and held by the conductive elastic member 22 held by the core body holder 23. This completes the electronic pen 1.

In this case, the length of the first housing portion 11 in the axial direction, the length of the front cap 14 in the axial direction, and the length of the core body 21 are selected so that a length L1 (see FIG. 1A) from the tip portion 21a of the core body 21 to the side of the ring-shaped flange portion 13F of the cylindrical coupling member 13 coupled to the first housing portion 11 is a length that prevents fingers from coming into contact when the user uses a hand to grip and use the electronic pen 1. The length of the tip portion 21a protruding outside from the opening of the front cap 14 mainly affects the length L1, and this is taken into account to select the length of the core body 21. Meanwhile, the length L1 can be set to 10 to 15 mm to provide the length that prevents the fingers of the user from coming into contact.

FIG. 5 illustrates an electrical configuration example of the electronic pen 1 of the embodiment. As illustrated in FIG. 5, the control circuit 41 includes an IC 40 mounted on the printed circuit board 31. Furthermore, a signal transmission circuit 42 and a reception circuit 43 are connected to the control circuit 41, and a variable capacitor 5C including the pressure sensing components 5 of the pen pressure detector is connected to the control circuit 41. A resistance 5R is connected in parallel to the variable capacitor 5C.

Furthermore, a signal output end of the signal transmission circuit 42 is connected to the core body 21 through the conductor terminal member 25, the core body holder 23, and the conductive elastic member 22. In addition, the first housing portion 11 (peripheral electrode) arranged to cover around the core body 21 is connected to an input end of the reception circuit 43 through the connection terminal conductor 16.

Furthermore, the power supply voltage from the battery 32 is supplied to each of the IC 41, the signal transmission circuit 42, and the reception circuit 43.

The reception circuit 43 receives a signal received by the peripheral electrode including the first housing portion 11 through capacitive coupling (electric field coupling) with the position detection sensor of the position detection apparatus. The reception circuit 43 performs a process, such as demodulation, according to the received signal and transmits a signal of the processing result to the control circuit 41.

The control circuit 41 analyzes the signal from the reception circuit 43 to determine the specifications of the position detection apparatus of the partner. Furthermore, the control circuit 41 controls the format of the signal to be output from the signal transmission circuit 42 based on the determination result so that the format matches the specifications of the position detection apparatus of the partner.

The signal transmission circuit 42 basically outputs, under the control of the control circuit 41, a signal including a position detection signal (burst signal) for the position detection in the position detection apparatus and including pen pressure information detected by the pressure sensing components 5 of the pen pressure detector. That is, the signal transmission circuit 42 transmits a burst signal for the position detection under the control of the control circuit 41. Furthermore, in a period in which the burst signal is transmitted from the signal transmission circuit 42, the control circuit 41 an operation of detecting the pen pressure based on the capacitance of the variable capacitor 5C including the pressure sensing components 5 of the pen pressure detector. For example, the control circuit 41 includes a processor and a memory storing instructions that, when executed by the processor, cause the control circuit 41 to perform the operation of detecting the pen pressure.

In the example, the control circuit 41 first charges the variable capacitor 5C to a fully charged state and then stops charging to discharge the variable capacitor 5C through the resistance 5R. Furthermore, the control circuit 41 measures the time period from the start of the discharge to the time that the voltage at both ends of the variable capacitor 5C becomes a predetermined voltage set in advance and detects the capacitance of the variable capacitor 5C at that time based on the time period. The capacitance of the variable capacitor 5C corresponds to the pen pressure applied to the core body 21 at that time, and the pen pressure is detected based on the detected capacitance.

Furthermore, the control circuit 41 controls the signal transmission circuit 42 to transmit, from the core body 21, pen pressure information including, for example, an encoded signal corresponding to the detected pen pressure after the end of the transmission period of the burst signal. The control circuit 41 further controls generation of a signal according to the determined specifications of the position detection apparatus of the partner, such as transmission of identification information of the electronic pen 1 and transmission of information of the remaining capacity of the battery 32.

Note that the circuit configurations of the position detection apparatus and the position detection sensor can be well-known circuit configurations, and configuration examples of the circuit configurations will not be described here.

Advantageous Effects of Embodiment

As described above, the housing 10 is separated into the first housing portion 11 and the second housing portion 12 in the electronic pen 1 of the embodiment, and the first housing portion 11 and the second housing portion 12 are fitted to one side and the other side of the cylindrical coupling member 13 in the axial direction, respectively, to form the housing 10. Furthermore, the cylindrical coupling member 13 is coupled to the pressure sensing component holding portion 302 of the board holder 30 in the embodiment. The pressure sensing components 5 of the components included in the pen pressure detector (the pressure sensing components 5 and the core body holder 23 as a pressure transmission member) are housed in the pressure sensing component holding portion 302 of the board holder 30, and the core body holder 23 as a pressure transmission member is housed in the cylindrical coupling member 13.

Figure 6:
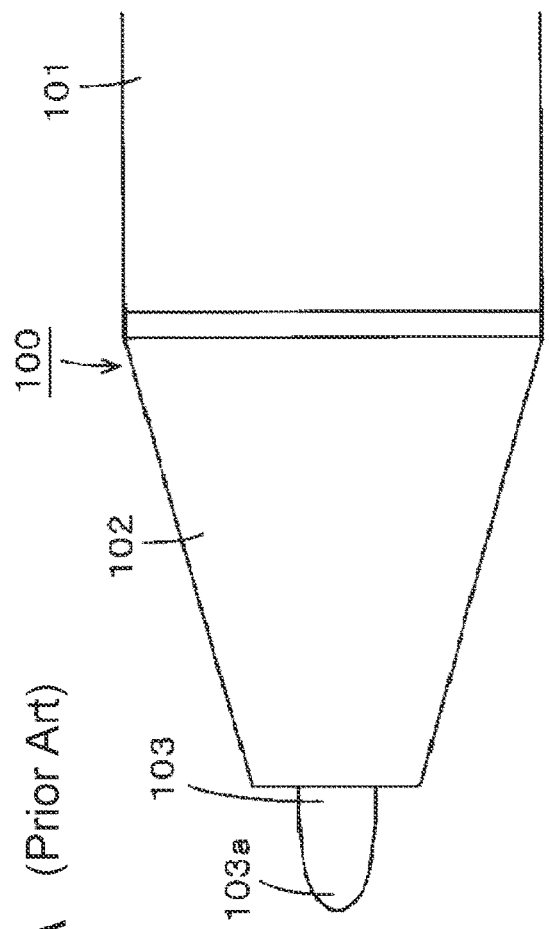
FIGS. 6A and 6B depicts diagrams for describing a configuration example of a conventional electronic pen.
Figure 6:
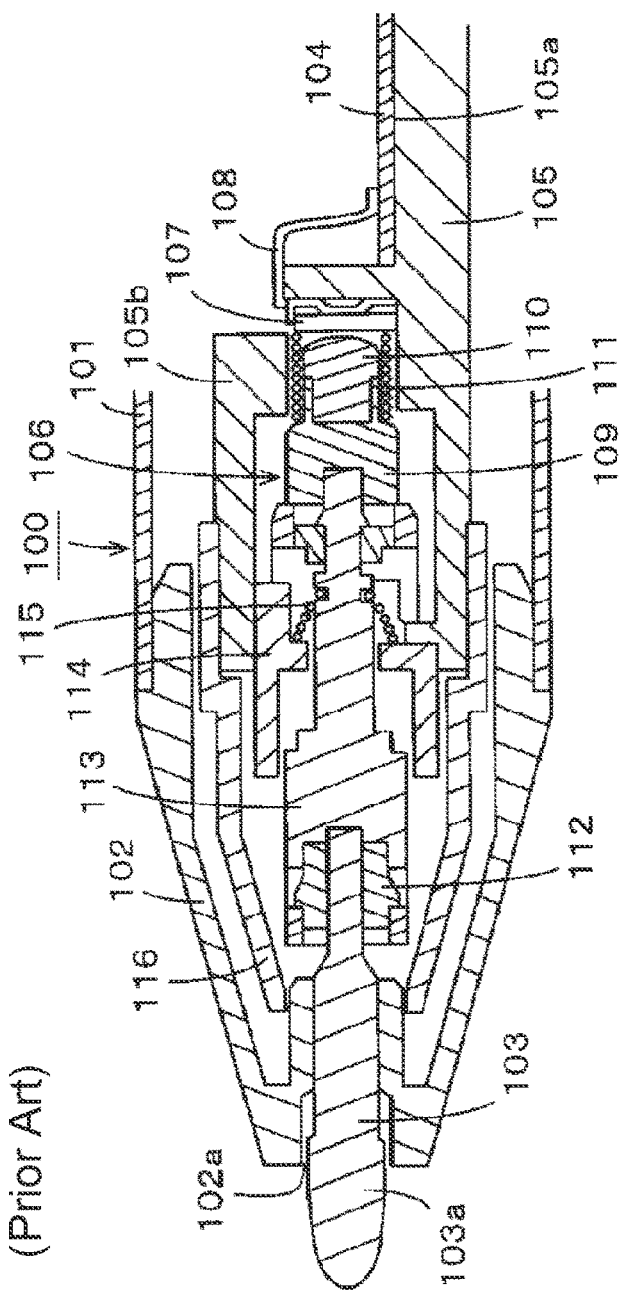

Therefore, compared to the configuration of the pen pressure detector in the conventional electronic pen 100 illustrated in FIGS. 6A and 6B, the cylindrical coupling member 13 is used as a housing that houses the core body holder 23 included in the pressure transmission member in the electronic pen 1 of the embodiment. Therefore, the housing 114 in the electronic pen 100 housed in the pressure sensing component holding portion 302 of the board holder 30 is unnecessary, and this reduces the thickness.

Furthermore, in the conventional electronic pen 100 illustrated in FIGS. 6A and 6B, the front cap 102 as an insulating material is placed between the housing 101 and the peripheral electrode 116 in the direction orthogonal to the axial direction of the electronic pen 100. On the other hand, in the electronic pen 100 of the embodiment, the ring-shaped flange portion 13F of the cylindrical coupling member 13 is placed in the axial direction to realize the electrical separation (insulation) of the first housing portion 11 included in the peripheral electrode and the second housing portion 12. The first housing portion 11 and the second housing portion 12 can be lined up in the axial direction, and the thickness can be reduced.

Furthermore, the electrical separation (insulation) of the first housing portion 11 as a peripheral electrode and the core body 21 is realized by only providing the front cap 14 in a simple cylindrical shape on the opening 11c side of the first housing portion 11. This is advantageous in that the front cap 102 with a special shape in the conventional electronic pen 100 illustrated in FIGS. 6A and 6B is unnecessary.

Other Embodiments or Modifications

In the embodiment as described above, the first fitting cylindrical portion 13a of the cylindrical coupling member 13 and the first housing portion 11 are pressed, fitted, and coupled, and the second fitting cylindrical portion 13b of the cylindrical coupling member 13 and the second housing portion 12 are pressed, fitted, and coupled to thereby provide the housing 10. However, the components may be screwed with each other, instead of the pressing and fitting. In addition, a ring-shaped projection portion may be provided on one of the first fitting cylindrical portion 13a of the cylindrical coupling member 13 and the first housing portion 11 or on one of the second fitting cylindrical portion 13b of the cylindrical coupling member 13 and the second housing portion 12, and a corresponding ring-shaped recess portion may be provided on the other. In this way, the ring-shaped projection portion and the ring-shaped recess portion can be used to engage and fit the components with a click sound.

In addition, the first fitting cylindrical portion 13a of the cylindrical coupling member 13 and the first housing portion 11 may be fitted by screwing, and the second fitting cylindrical portion 13b of the cylindrical coupling member 13 and the second housing portion 12 may be fitted by pressing or by engagement with a click sound. Conversely, the second fitting cylindrical portion 13b of the cylindrical coupling member 13 and the second housing portion 12 may be fitted by screwing, and the first fitting cylindrical portion 13a of the cylindrical coupling member 13 and the first housing portion 11 may be fitted by pressing or by engagement with a click sound.

Furthermore, in the embodiment as described above, the outer diameter of the end surface of the ring-shaped flange portion 13F of the cylindrical coupling member 13, the outer diameter of the first housing portion 11, and the outer diameter of the second housing portion 12 are all the same, and the housing 10 has a shape without recess and projection areas in the axial direction. However, the outer diameter of the end surface of the ring-shaped flange portion 13F of the cylindrical coupling member 13, the outer diameter of the first housing portion 11, and the outer diameter of the second housing portion 12 may not be all the same. For example, the outer diameter of the first housing portion 11 and the outer diameter of the second housing portion 12 may be the same, and the outer diameter of the ring-shaped flange portion 13F may be larger or smaller than that. In this case, the outer diameter of the ring-shaped flange portion 13F is large, and the part is a projection portion in the housing 10. The part serves as a handhold for preventing the fingers from coming into contact with the first housing portion 11 side when the user grips the electronic pen to use the electronic pen, and this is convenient.

In addition, the outer diameter of the first housing portion 11 and the outer diameter of the second housing portion 12 may be different from each other, and the outer diameter of the ring-shaped flange portion 13F may be equal to one of the first housing portion 11 and the second housing portion 12. In this case, the difference in level generated on the peripheral surface of the housing 10 also serves as a handhold for preventing the fingers from coming into contact with the first housing portion 11 side when the user grips the electronic pen to use the electric pen, and this is convenient.

In the embodiment, the cylindrical coupling member 13 and the pressure sensing component holding portion 302 of the board holder 30 are partially fitted and coupled. However, the end portion of the second fitting cylindrical portion 13b of the cylindrical coupling member 13 in the axial direction and the end portion of the pressure sensing component holding portion 302 of the board holder 30 in the axial direction may be simply abutted against each other.

In addition, the holding portion of the pressure sensing components 5 of the pen pressure detector may be integrated with the second fitting cylindrical portion 13b side of the cylindrical coupling member 13, instead of integrating the holding portion with the board holder 30.

In addition, the cylindrical coupling member 13 and the board holder 30 may be integrated. In this case, the outer diameter of the part of the board holder 30 can be smaller than the outer diameter of the second fitting cylindrical portion 13b of the cylindrical coupling member 13 to facilitate the housing in the second housing portion 12.

Note that, although not only the first housing portion 11, but also the second housing portion 12 is made of a conductive material in the embodiment as described above, the second housing portion 12 may not be made of a conductive material, and the second housing portion 12 may be made of an insulating material, such as a resin.

Note that, although the first housing portion 11 included in the peripheral electrode is dedicated to the signal reception in the electronic pen described in the embodiment as described above, the first housing portion 11 may transmit a signal in the electronic pen.

For example, when the electronic pen is in the air (generally-called hover state) without coming into contact with the input surface of the position detection sensor, the signal can be transmitted from not only the core body 21, but also from the first housing portion 11 as a peripheral electrode, or the signal may be transmitted from the first housing portion 11 instead of the signal transmission from the core body 21. In this way, the position detection sensor can easily detect an approximate position of the electronic pen in the hover state.

Furthermore, as in the electronic pen of Patent Document 2 as described above, the signal can be transmitted from the first housing portion 11 as a peripheral electrode to allow the position detection apparatus to detect the tilt of the electronic pen.

Note that, although the core body 21 only transmits a signal to the position detection sensor in the electronic pen 1 of the embodiment as described above, the core body 21 can transmit a signal to the position detection sensor and receive a signal from the position detection sensor in time division in the electronic pen.

In addition, although the signals are transmitted and received only between the core body 21 and the position detection sensor of the position detection apparatus or between the first housing portion 11 and the position detection sensor of the position detection apparatus in the electronic pen of the embodiment as described above, the electronic pen may use wireless communication means of, for example, a Bluetooth (registered trademark) standard to transmit and receive signals to and from the position detection apparatus through wireless communication.

Note that, although the dielectric 51 is placed between the terminal member 52 and the conductive member 54 in the pressure sensing components of the pen pressure detector to provide the variable capacitor in the embodiment as described above, a semiconductor element as a variable capacitor including an MEMS (Micro Elector Mechanical Systems) element may also be used, in which the capacitance is variable according to the pen pressure, as disclosed in, for example, Japanese Patent Laid-Open No. 2013-161307.

In addition, although the first housing portion 11 includes one conductive member in the embodiment as described above, the first housing portion 11 may be divided in the circumferential direction to provide a plurality of conductive members, such as two or three conductive members. Signals may be independently supplied to the plurality of conductive members to transmit the signals to the position detection sensor. In this case, the position detection apparatus can also detect the angle of rotation of the electronic pen.

DESCRIPTION OF REFERENCE SYMBOLS

1 . . . Electronic pen, 10 . . . Housing, 11 . . . First housing portion, 12 . . . Second housing portion, 13 . . . Cylindrical coupling member, 13a . . . First fitting cylindrical portion, 13b . . . Second fitting cylindrical portion, 13F . . . Ring-shaped flange portion, 14 . . . Front cap, 15 . . . Back cap, 16 . . . Connection terminal conductor, 21 . . . Core body, 22 . . . Conductive elastic member, 23 . . . Core body holder, 24 . . . Coil spring, 25 . . . Conductor terminal member, 30 . . . Board holder, 301 . . . Board mounting table portion, 302 . . . Pressure sensing component holding portion, 31 . . . Printed board, 32 . . . Battery, 41 . . . Control circuit, 42 . . . Signal transmission circuit, 43 . . . Reception circuit.

The invention claimed is:

1. An electronic pen comprising:
a cylindrical coupling member including a first cylindrical portion, a second cylindrical portion, and a third cylindrical portion disposed between the first cylindrical portion and the second cylindrical portion; and
a cylindrical housing including a first housing portion, a second housing portion, and the third cylindrical portion of the cylindrical coupling member, the third cylindrical portion of the cylindrical coupling member separating the first housing portion and the second housing portion in an axial direction of the cylindrical housing;
a core body made of a conductive material, the core body having a front end that protrudes from an opening in the first housing portion; and
a plurality of components,
wherein an outer diameter of the third cylindrical portion is greater than an outer diameter of the first cylindrical portion and an outer diameter of the second cylindrical portion,
wherein the first cylindrical portion of the cylindrical coupling member is disposed within and fitted to the first housing portion,
wherein the second cylindrical portion of the cylindrical coupling member is disposed within and fitted to the second housing portion, and
wherein the outer diameter of the third cylindrical portion is equal to an outer diameter of the first housing portion and an outer diameter of the second housing portion.

2. The electronic pen according to claim 1, wherein
the first housing portion and the second housing portion are made of a conductive material, and
the third cylindrical portion is a ring-shaped flange portion that electrically insulates the first housing portion from the second housing portion.

3. The electronic pen according to claim 1, wherein
a side surface of the first housing portion, a side surface of the second housing portion, and a side surface of the third cylindrical portion are flush.

4. The electronic pen according to claim 1, wherein:
the first housing portion has a cylindrical shape on a side of the first housing portion coupled to the first cylindrical portion of the cylindrical coupling member in the axial direction of the cylindrical housing, and
the first housing portion has a tapered shape on a side of the of the first housing portion that is opposite the side of the first housing portion coupled to the first cylindrical portion of the cylindrical coupling member.

5. The electronic pen according to claim 4,
wherein an insulating material is arranged between the first housing portion and the core body.

6. The electronic pen according to claim 1, wherein
the second housing portion is made of a conductive material, and a potential of the second housing portion is fixed.

7. The electronic pen according to claim 1,
wherein the plurality of components include a pen pressure detector which, in operation, detects pressure applied to the core body, and
wherein the cylindrical coupling member provides part of a housing of the pen pressure detector.

8. The electronic pen according to claim 7, wherein
the pen pressure detector includes a plurality of pressure sensing components, and a plurality of pressure transmission components that transmit a pressure applied to the core body to the pressure sensing components, and
at least some of the pressure transmission components are housed in the cylindrical coupling member.

9. The electronic pen according to claim 8, wherein
a holder including a pressure sensing component housing portion that houses the pressure sensing components of the pen pressure detector is arranged in the cylindrical housing, and
the cylindrical coupling member is coupled to the pressure sensing component housing portion of the holder in the axial direction of the cylindrical housing.

10. The electronic pen according to claim 9, wherein
the cylindrical coupling member is integrated with the holder.

11. The electronic pen according to claim 1,
wherein the core body transmits an instruction position detection signal.

12. The electronic pen according to claim 1,
wherein the core body transmits an instruction position detection signal and receives a signal from a position detection sensor.

13. The electronic pen according to claim 1, wherein the first housing portion provides a reception electrode that receives a signal from a position detection sensor.

14. The electronic pen according to claim 1, wherein a first end of a connection conductor with a second end connected to an electronic circuit housed in the second housing portion is arranged in an exposed state on a peripheral surface of a fitting portion fitted to a first housing portion side of the cylindrical coupling member with respect to the third cylindrical portion, and the first housing portion is fitted to the cylindrical coupling member and electrically connects the first housing portion and the connection conductor.

15. The electronic pen according to claim 1, wherein the first housing portion is disposed at a position where fingers of a user are not in contact when the front end of the core body is subjected to electric field coupling to a position detection sensor to instruct a position.

16. The electronic pen according to claim 15, wherein the third cylindrical portion of the cylindrical coupling member is a ring-shaped flange portion, and a length from the front end of the core body to the ring-shaped flange portion of the cylindrical coupling member is in a range of 10 to 15 mm.

17. The electronic pen according to claim 1, wherein the first housing portion is made of a conductive material and the opening is arranged such that the front end of the core body protrudes outside of the first housing portion through the opening in a state in which the first housing portion is electrically separated from the core body.

* * * * *